United States Patent [19]

Hiller

[11] 4,218,437

[45] Aug. 19, 1980

[54] ANIMAL FEEDS CONTAINING A MIXTURE OF VIRGINIAMYCIN, ZINC BACITRACIN OR FLAVOPHOSPHOLIPOL AND PROTEOLYTIC ENZYMES

[75] Inventor: Guenter Hiller, Erkrath, Fed. Rep. of Germany

[73] Assignee: Henkel Kommanditgesellschaft auf Aktien (Henkel KGaA), Dusseldorf-Holthausen, Fed. Rep. of Germany

[21] Appl. No.: 952,410

[22] Filed: Oct. 18, 1978

Related U.S. Application Data

[63] Continuation-in-part of Ser. No. 814,047, Jul. 8, 1977, abandoned, and Ser. No. 814,048, Jul. 8, 1977, abandoned.

[30] Foreign Application Priority Data

Jul. 23, 1976 [DE] Fed. Rep. of Germany ....... 2633105
Jul. 23, 1976 [DE] Fed. Rep. of Germany ....... 2633106
Nov. 30, 1977 [DE] Fed. Rep. of Germany ....... 2753309

[51] Int. Cl.$^2$ ......................... A23K 1/165; A23K 1/17
[52] U.S. Cl. ....................................... 424/94; 424/118; 424/177; 426/2; 426/53; 426/623; 426/630; 426/807; 260/112.5 R

[58] Field of Search ....................... 426/2, 43, 53, 630, 426/623, 635, 807; 424/177, 118, 94; 260/112.5 R

[56] References Cited

U.S. PATENT DOCUMENTS

| 2,809,892 | 10/1957 | Chornock ........................... 424/177 |
| 3,017,272 | 1/1962 | Van Dijck ........................... 426/807 |
| 3,455,696 | 7/1969 | Ukita ................................... 426/43 X |
| 4,062,732 | 12/1977 | Lehmann et al. ..................... 426/53 |

OTHER PUBLICATIONS

The Merck Index, Ninth Edition, Windholz (Ed), Merck & Co. Publishers, 1976, pp. 126, 1285 & 1307.
Goldberg, Antibiotics Their Chemistry & Non Medical Uses, Van Nostrand Co. Publishers, pp. 174–183.

Primary Examiner—R. B. Penland
Attorney, Agent, or Firm—Hammond & Littell, Weissenberger and Muserlian

[57] ABSTRACT

Animal feeds based on carbohydrates, protein and fats containing from 5 to 150 ppm of one of the antibiotics Virginiamycin, zinc Bacitracin or flavophospholipol and a content of proteolytic enzymes in such an amount that the enzymatic activity is from 0.05 to 2.5 mTU/gm of said animal feed.

31 Claims, No Drawings

ANIMAL FEEDS CONTAINING A MIXTURE OF VIRGINIAMYCIN, ZINC BACITRACIN OR FLAVOPHOSPHOLIPOL AND PROTEOLYTIC ENZYMES

REFERENCE TO PRIOR APPLICATION

This is a continuation-in-part to my prior applications Ser. No. 814,047 and Ser. No. 814,048, both filed July 8, 1977, both now abandoned.

BACKGROUND OF THE ART

High-potency animal feeds, as they are normally used today in intensive animal raising, contain a number of additives of prophylactic and/or nutritive effect. These include, among others, antibiotics and enzymes. While the use of antibiotics has found acceptance in mixed feeds of all kinds, enzymes are not as yet used on a large scale in the field.

Thus, U.S. Pat. No. 3,017,272 suggests the use of from 1 to 200 ppm of Virginiamycin in feeds, U.S. Pat. No. 2,809,892 suggests the use of from 1 to 25 ppm of zinc Bacitracin in feeds, U.S. Pat. No. 4,062,732 suggests the use of certain acid proteases in feed, and U.S. Pat. No. 3,455,696 suggests the use of procaine penicillin, dehydrostreptomycin or tetracycline and an acid protease in feeds.

The feed mixtures used in modern intensive animal raising programs are generally optimized in all nutrient components to the extent that further improvement does not seem readily possible.

OBJECTS OF THE INVENTION

An object of the present invention is the development of a mixture of antibiotics and enzymes which will improve the present efficiency of animal feeds.

Another object of the present invention is the development of a high efficiency animal feed based on carbohydrates, protein and fats and containing from 5 to 150 ppm of one of the antibiotics Virginiamycin, zinc Bacitracin or flavophospholipol and a content of proteolytic enzymes in such an amount that the enzymatic activity is from 0.05 to 2.5 mTU/gm of said animal feed.

A further object of the invention is the development of a method for efficient rearing of animals comprising feeding animals a high efficiency animal feed based on carbohydrates, protein and fats and containing from 5 to 150 ppm of one of the antibiotics Virginiamycin, zinc Bacitracin or flavophospholipol and a content of proteolytic enzymes in such an amount that the enzymatic activity is from 0.05 to 2.5 mTU/gm of said animal feed.

These and other objects of the invention will become more apparent as the description thereof proceeds.

DESCRIPTION OF THE INVENTION

It has been surprisingly found that even optimally composed high-potency (high efficiency) feeds can be further improved with respect to feed utilization and/or the weight gain attainable therewith by adding to these feeds certain antibiotics together with proteolytic enzymes, particularly acid proteases.

The subject of the invention, accordingly, is an animal feed mixture based on carbohydrates, protein, and fats and optionally the customary additives, characterized by a content of 5 to 150 ppm of one of the antibiotics Virginiamycin, zinc Bacitracin or flavophospholipol and a quantity of proteolytic enzymes such that an enzymatic activity of 0.05 to 2.5 mTU/gm is present.

More particularly, the present invention relates to a high efficiency animal feed based on carbohydrates, protein and fats and containing from 5 to 150 ppm of an antibiotic selected from the group consisting of Virginiamycin, zinc Bacitracin and flavophospholipol, and a content of proteolytic enzymes, particularly acid proteolytic enzymes, in such an amount that the enzymatic activity is from 0.05 to 2.5 mTU/gm of said animal feed; as well as a method for efficient rearing of animals comprising feeding animals a high efficiency animal feed based on carbohydrates, protein and fats and containing from 5 to 150 ppm of an antibiotic selected from the group consisting of Virginiamycin, zinc Bacitracin and flavophospholipol, and a content of proteolytic enzymes, particularly acid proteolytic enzymes, in such an amount that the enzymatic activity is from 0.05 to 2.5 mTU/gm of said animal feed.

The antibiotic Virginiamycin is a known antibiotic belonging to the peptolide group. It is produced by a strain of the fungus Streptomyces virginiae and consists of a mixture of the components Type M (empirical formula $C_{28}H_{35}N_3O_7$) and Type S (empirical formula $C_{43}H_{49}N_7O_{10}$).

The antibiotic zinc Bacitracin belongs to the group of the polypeptide antibiotics. These commercial preparations are mixtures of various polypeptides with a zinc content of 20%. The starting form of Bacitracin is produced in known manner from strains of Bacillus licheniformis.

The antibiotic flavophospholipol (Flavomycin ®) is a phosphorus-containing glycolipid of the composition 48.5% C, 7.3% H, 37.3% O, 5.1% N, 1.8% P and a molecular weight in the alkaline range of 1700. It is formed by a group of gray-green Streptomyces, which are deposited in the American Type Culture Collection under the number ATCC 13879, ATCC 14762, ATCC 15503 and ATCC 15304.

Suitable proteolytic enzymes to be employed according to the invention are obtained above all by culturing microorganisms and separation of the enzymes produced from the culture solutions. The processes for this are known. Proteolytic enzymes can be used as produced, for example, from Bacillus licheniformis, Bacillus natta, Bacillus subtilis, etc. Especially preferred are acid proteases, e.g., from *Aspergillus niger* or those described in U.S. Pat. Nos. 3,674,644 and 3,677,898. Acid proteases from the genus Tramates or from Rhizopus rhizopodiformis according to U.S. Pat. No. 4,062,732 are particularly preferred. Such proteases have a particularly wide spectrum of action in the weakly acid range between pH 2.5 and 6.5. These acid proteases preferably have a pH range of 50% of maximum activity of between a pH of 2.5 and a pH of 6.5.

Commercial feed mixtures are optimally composed for the special needs of the various animal species. They are customarily based on carbohydrates, proteins and fats with optional customary feed supplements or additives. The carbohydrates are chiefly from cereal components, corn or the like. The protein carriers are primarily extracted soybean meal pellets, fish meal, animal body meal, bran and the like. Essential amino acids which are lacking, for example, methionine, can be added. The fats are employed in the form of plant or animal fats, or added in the form of waste fats. For body building, there are added further salts, such as dicalcium phosphate, calcium carbonate, and common salt. Optionally, the feed mix is balanced by the addition of trace elements, vitamins, ballast substances, etc. Also substances produced fermentatively, such as single cell proteins from petroleum fractions or alcohols, various yeasts, algae protein or others, possibly also substances recovered from waste materials, may be a component part of the feed formulation, in part to a considerable degree.

The animal feed mixtures of the invention contain in addition to the usual components adapted for certain animal species or feed use, additionally 5 to 150 ppm of one of the antibiotics Virginiamycin, zinc Bacitracin or flavophospholipol and the proteolytic enzymes in a quantity such that the enzymatic activity is from 0.05 to 2.5 mTU/gm, preferably 0.2 to 0.5 mTU/gm. In particular, a combination of one of the above-mentioned antibiotics and an acid fungus protease or respectively protease mixture is employed. The weight gain, or respectively the improvement in the feed utilization achieved thereby, is up to 4% in comparison with corresponding control mixtures containing only one of the antibiotics.

Excellent results are obtained (1) when Virginiamycin is employed in amounts of 7.5 ppm to 15 ppm or 40 ppm to 80 ppm, (2) when zinc Bacitracin is employed in amounts of 7.5 ppm to 15 ppm or 80 ppm to 150 ppm, or (3) when flavophospholipol is employed in amounts of 60 ppm to 100 ppm. However, the improved results of the invention are obtained generally when any one of the antibiotics is employed in the broad range of 5 ppm to 150 ppm, together with the proteolytic enzymes.

At the lower usage levels the active combination of Virginiamycin or zinc Bacitracin and proteolytic enzymes is successful especially in feed for fattening cockerels (broiler production). However, it can be useful also for all other kinds of animals where the use of Virginiamycin or zinc Bacitracin or flavophospholipol alone is already of advantage, for example, in hog fattening and in feed for laying hens.

At the higher usage levels the active combination of the mentioned antibiotics and enzymes is successful especially in piglet starter and raising feeds. It may, however, be useful also for all other animal species where the use of the mentioned antibiotics alone is already of advantage, such as, in hog fattening, in laying hen feed, and in raising calves.

The antibiotic is expediently added to the feed in the form of a premix, for example, combined with extracted soybean meal pellets. When using mixed meal type feed compositions, the enzyme component is also applied as a premix. Here, as carrier substance, any feed component can be used, for example, again extracted soybean meal pellets. When employing steam-tempered pelletizing of animal feeds, the admixture of the enzymes must occur in suitable stabilized form, to prevent deactivation by moisture and heat during the pelletizing. Such a method is the subject, for example, of U.S. patent application Ser. No. 760,358, filed Jan. 19, 1977, now abandoned.

To determine the enzymatic activity of the enzyme unit (TU), the proteolytic activity of the protease is ascertained by the known principle of Anson. A suitable diluted quantity of enzyme solution is incubated for twenty minutes at 40° C. with an equal volume of a 1.2% casein solution, the latter containing 0.6% lactic acid, 6 mols of urea and 0.1 mol of citric or acetic acid. The pH value of the casein solution is adjusted to 4.5 by addition of 2 N sodium hydroxide solution. After the incubation, the procedure is to admix with 0.4 N trichloroacetic acid in the volumetric ratio 1:1. The forming precipitate of undigested casein is filtered, and the protein cleavage products formed during degradation are ascertained in the filtrate by any method of protein determination. Suitable for this is, for example, the method described by Layne in Method of Enzymology 3 (1975), pages 448 ff.

For each test sample a blank value must be produced, wherein first trichloroacetic acid and then casein solution is added. This blank value indicates, in addition to the reagent blank value, the proportion of peptides of low molecular weight already present before the digestion in the enzyme solution. The difference between main and blank value is then compared, following the indicated method, with the extinction, which is given by a predetermined amount of tyrosine. This amount of tyrosine is then a measure of the proteolytic activity of the enzyme being determined. The enzyme unit (TU) is that amount of enzyme which releases in one minute from the casein solution the cleavage products which have the same extinction value as a 1 M tyrosine solution. It is customary to express this in $mTU = 10^{-3} TU$.

The following examples are illustrative of the invention without being limitative in any respect.

EXAMPLE 1

270 Male one-day chicks of Lohmann origin were raised in a battery for six weeks and fed with identically composed feed mixes, but
 (a) without addition of antibiotic or enzyme,
 (b) with addition of 15 ppm Virginiamycin (VGN)
 (c) with addition of 15 ppm Virginiamycin (VGN) and 0.45 mTU/gm of acid proteases (E) from *Rhizopus rhizopodiformis* (according to U.S. Pat. No. 4,062,732,
 (d) with the addition of 0.45 mTU/gm of acid proteases (E) from *Rhizopus rhizopodiformis*,
and after conclusion of the test, the end weight and the feed utilization were determined. The "feed utilization" is the ratio of feed consumption to the weight gain.

TABLE 1

| Feed Composition | % By Weight |
|---|---|
| Extracted soybean meal pellets | 31.00 |
| Corn | 55.31 |
| Animal body meal | 5.00 |
| Beef tallow | 5.80 |
| Soybean oil | 0.20 |
| Dicalcium phosphate | 1.34 |
| Calcium carbonate | 0.37 |
| Common salt | 0.25 |
| DL-methionine | 0.17 |
| Trace element premix | 0.20 |
| Vitamin premix | 0.20 |
| Coccidiostatic premix | 0.16 |
| | 100.00 |

| RESULTS | End Weight (gms) | Feed Utilization |
|---|---|---|
| (a) w/o Addition | 1,459 | 1.82 |
| (b) With VGN | 1,504 | 1.80 |
| (c) With VGN + E | 1,524 | 1.72 |
| (d) With E | 1,472 | 1.83 |

VGN = Virginiamycin
E = Proteolytic enzymes from the mentioned micro-organisms

EXAMPLE 2

720 Male broiler chicks of Lohmann origin were raised on soil for six weeks and fed with a uniform feed of the composition mentioned below. After conclusion of the period, the end weight of the chickens as well as the feed utilization were determined analogously to Example 1. The feed mixtures were identically composed and contained:

(a) No addition of antibiotic or enzyme,
(b) An addition of 7.5 ppm Virginiamycin,
(c) An addition of 7.5 ppm Virginiamycin and 0.45 mTU/gm of acid proteases from *Aspergillus niger* (E')
(d) An addition of 0.45 mTU/gm of acid proteases from *Aspergillus niger* (E')

TABLE 2

| Feed Composition | % By Weight |
|---|---|
| Soybean meal pellets | 37.35 |
| Corn | 52.325 |
| DL-methionine | 0.3 |
| Soybean oil | 6.0 |
| Dicalcium phosphate | 1.82 |
| Calcium carbonate | 1.03 |
| Common salt | 0.31 |
| Trace elements premix | 0.065 |
| Vitamin premix | 0.25 |
| Choline chloride 50% | 0.2 |
| Coyden | 0.05 |
| Oat husks, ground | 0.30 |
| | 100.000 |

| RESULTS | End Weight (gms) | Feed Utilization |
|---|---|---|
| (a) w/o Addition | 1,443 | 1.90 |
| (b) With VGN | 1,495 | 1.85 |
| (c) With VGN + E' | 1,518 | 1.83 |
| (d) With E' | 1,451 | 1.91 |

VGN = Virginiamycin
E' = Proteolytic enzymes from the mentioned micro-organisms

The above two examples demonstrate that the addition of the antibiotic Virginiamycin at a level of either 7.5 ppm or 15 ppm slightly improves both the end weight and the feed utilization, whereas the addition of the acid proteases at a level of 0.45 mTU/gm scarcely effects the end weight or feed utilization. Completely unexpectedly, a combination of both causes an effect which is more than additive which for Example 1 would be a feed utilization of 1.81 (1.82-0.01+0.02) and for Example 2, a feed utilization of 1.86 (1.90-0.01+0.05).

EXAMPLE 3

Starting with an average initial live weight of about 10 kg, 64 piglets of the DL strain were fed for 35 days identically composed feed mixtures, but (a) without addition of antibiotic or enzyme
(b) with addition of 60 ppm Virginiamycin (VGN)
(c) with addition of 60 ppm Virginiamycin and 0.3 mTU/gm of acid proteases (E) from *Aspergillus niger* and *Rhizopus rhizopodiformis* and after conclusion of the test the daily weight increase per animal and the feed utilization were determined. By "feed utilization" is understood the ratio of feed consumption to weight increase.

TABLE 3

| Feed Composition | % By Weight |
|---|---|
| Barley | 32.0 |
| Soybean meal | 24.0 |
| Remilled wheat | 20.0 |
| Oats | 10.0 |
| Alfalfa green flour | 5.0 |
| Feed yeast | 2.0 |

TABLE 3-continued

| | |
|---|---|
| Soybean oil | 1.8 |
| Vitamin and trace element premix | 2.4 |
| Phosphate of feed lime | 1.5 |
| Carbonate of feed lime | 0.8 |
| Cattle salt | 0.5 |
| | 100.0 |

| RESULTS | Daily Increase per Animal in gms | Feed Utilization |
|---|---|---|
| (a) w/o Addition | 626 | 2.08 |
| (b) With VGN | 640 | 2.08 |
| (c) With VGN + E | 662 | 2.06 |

VGN = Virginiamycin
E = Proteolytic enzymes from the abovementioned microorganisms The preceding examples clearly demonstrate that the presence of both the antibiotic Virginiamycin and proteolytic enzymes, preferably acid proteases, increase both the end weight and feed utilization ratio. Comparable results are obtained with feed for laying hens.

EXAMPLE 4

160 Male one-day chicks of Lohmann origin were raised in a battery of six weeks and fed with identically composed feed mixes, but (a) without addition of antibiotic or enzyme,
(b) with addition of 10 ppm zinc Bacitracin (Zn-Bac),
(c) with addition of 10 ppm zinc Bacitracin (Zn-Bac) and 0.3 mTU/gm of acid proteases (E') from *Aspergillus niger*,
(d) with addition of 0.3 mTU/gm of acid proteases (E') from *Aspergillus niger*.

and after conclusion of the test the end weight and the feed utilization were determined. The "feed utilization" is the ratio of feed consumption to the weight gain.

TABLE 4

| Feed Composition | % by Weight |
|---|---|
| Corn, cracked | 50.0 |
| Extracted soybean meal pellets | 18.5 |
| Wheat by-products after flour separation | 15.0 |
| Feed fat (soybean oil/lard in 1:1 ratio | 6.0 |
| Feed blood meal | 3.5 |
| Meat bonemeal | 3.0 |
| Fishmeal | 1.0 |
| Mineral substance premix | 1.0 |
| Vitamin premix | 1.0 |
| Feed grade acid calcium phosphate | 0.89 |
| Trace element premix | 0.1 |
| Antibiotic premix | 0.01 |
| | 100.00 |

| RESULTS | End Weight (gms) | Feed Utilization |
|---|---|---|
| (a) w/o addition | 1,518 | 1.86 |
| (b) with Zn—Bac | 1,515 | 1.86 |
| (c) with Zn—Bac + E' | 1,557 | 1.80 |
| (d) with E' | 1,502 | 1.85 |

Zn—Bac = Zinc Bacitracin
E' = Proteolytic enzymes from the mentioned microorganisms This example demonstrates that the addition of the antibiotic zinc Bacitracin at a level of 10 ppm has substantially no effect on either the end weight or feed utilization, and the addition of 0.3 mTU/gm of the acid proteases likewise has substantially no effect on the feed utilization and a slight decrease in the end weight. Completely unexpectedly a combination of both cause an effect which is much more than additive, both in end weight and feed utilization. The additive effect on end weight would be expected to be 1518−16−3=1499 and on feed utilization would be expected to be 1.86−0.01+0.00=1.85.

EXAMPLE 5

191 DL piglets having an average initial live weight of about 12 kg were fed in a flat deck for 27 days identically composed feed mixtures, but
  (a) without addition of antibiotic or enzyme,
  (b) with addition of 120 ppm zinc Bacitracin (Zn-Bac),
  (c) with addition of 120 ppm zinc Bacitracin (Zn-Bac) and 0.32 mTU/gm acid proteases from *Rhizopus rhizopodiformis* (E),
and after conclusion of the test the daily weight increase per animal and the feed utilization were determined. The feed utilization is the ratio of feed consumption to weight increase.

TABLE 5

| Feed Composition | % by Weight |
| --- | --- |
| Barley | 20.0 |
| Oats | 15.0 |
| Corn | 15.0 |
| Wheat | 10.0 |
| Wheat bran | 17.0 |
| Alfalfa green meal | 2.0 |
| Soybean meal | 12.0 |
| Fish meal | 6.0 |
| Mineral feed | 3.0 |
| | 100.0 |

| RESULTS | Daily Increase per Animal in gms | Feed Utilization |
| --- | --- | --- |
| (a) w/o Addition | 452 | 2.09 |
| (b) With Zn—Bac | 495 | 2.04 |
| (c) With Zn—Bac + E | 520 | 1.90 |

EXAMPLE 6

2100 HNL laying hens were fed in cages for 6 months identically composed feed mixtures, but
  (a) without addition of antibiotic or enzymes,
  (b) with addition of 100 ppm zinc Bacitracin (Zn-Bac),
  (c) with addition of 100 ppm zinc Bacitracin+0.2 mTU/gm acid proteases (E) from *Aspergillus niger* and *Rhizopus rhizopodiformis*
and during this period the laying capacity, average egg weight, total egg mass, feed utilization and proportion of cracked eggs were determined. The laying capacity in % is referred to the theoretical maximum of one egg a day; the feed utilization is the ratio of the feed consumption to kg of egg mass; cracked eggs cannot be utilized and are therefore a negative test parameter.

TABLE 6

| Feed Composition | % by Weight |
| --- | --- |
| Corn | 53.0 |
| Corn germ grits | 6.0 |
| Corn gluten feed | 6.0 |
| Yellow corn gluten | 3.0 |
| Soybean grits | 19.0 |
| Fat | 2.0 |
| Molasses | 2.0 |
| Meat-bone meal | 1.0 |
| Carbonate of lime | 7.0 |
| Dicalcium phosphate | 1.0 |
| | 100.0 |

TABLE 6-continued

| RESULTS | (a) w/o addition | (b) with Zn—Bac | (c) with Zn—Bac + E |
| --- | --- | --- | --- |
| Laying capacity | 77% | 77% | 78% |
| Average egg weight in gms | 59.1 | 59.2 | 60.7 |
| Total egg mass in kg | 5874.540 | 5884.480 | 6118.560 |
| Feed utilization | 2.628 | 2.577 | 2.511 |
| Proportion of cracked eggs | 6.0 | 6.5 | 4.0 |

Zn—Bac: Zinc Bacitracin
E: Proteolytic enzymes from the mentioned microorganisms The preceding examples 4 to 6 clearly demonstrate that the presence of both the antibiotic zinc Bacitracin and proteolytic enzymes, preferably acid proteases, increase both the end weight and feed utilization ratio.

EXAMPLE 7

Starting at an average live weight of about 10 kg, 52 piglets of the DL strain were fed for 35 days identically composed feed mixtures, but
  (a) with addition of 80 ppm flavophospholipol (Fl),
  (b) with addition of 80 ppm flavophospholipol and 0.38 mTU/gm acid proteases (E) from *Aspergillus niger* and *Rhizopus rhizopodiformis*
and after conclusion of the test the daily weight increase per animal and the feed utilization were determined. The "feed utilization" is the ratio of feed consumption to weight increase.

Feed Composition

The feed composition was identical with that of Example 3.

| RESULTS | Daily Increase per Animal in gms | Feed Utilization |
| --- | --- | --- |
| (a) With Fl | 648 | 2.20 |
| (b) With Fl + E | 680 | 2.18 |

Fl: Flavophospholipol
E: Proteolytic enzymes from the mentioned microorganisms

This example demonstrates that the same results are obtained with the combination of the antibiotic flavophospholipol and proteolytic enzymes, preferably acid proteases, as with the previous combinations tested.

The preceding specific embodiments are illustrative of the practice of the invention. It is to be understood, however, that other expedients known to those skilled in the art or disclosed herein may be employed without departing from the spirit of the invention or the scope of the appended claims.

I claim:
1. A high efficiency animal feed comprising carbohydrates, protein and fats and containing from 5 to 150 ppm of an antibiotic selected from the group consisting of Virginiamycin, zinc Bacitracin and flavophospholipol and a content of acid proteolytic enzymes with a wide spectrum of action in the range of between a pH of 2.5 and 6.5 in such an amount that the enzymatic activity is from 0.05 to 2.5 mTU/gm of said animal feed.
2. The animal feed of claim 1 wherein said acid protease has a pH range of 50% of maximum activity of between a pH of 2.5 and a pH of 6.5.
3. The animal feed of claim 1 wherein said enzymatic activity is from 0.2 to 0.5 mTU/gm of said animal feed.

4. The animal feed of claim 1 wherein said antibiotic is Virginiamycin and is present in an amount of from 5 to 20 ppm.

5. The animal feed of claim 1 wherein said antibiotic is Virginiamycin and is present in an amount of from 7.5 to 15 ppm.

6. The animal feed of claim 1 wherein said antibiotic is Virginiamycin and is present in an amount of from 21 to 150 ppm.

7. The animal feed of claim 1 wherein said antibiotic is Virginiamycin and is present in an amount of from 40 to 80 ppm.

8. The animal feed of claim 1 wherein said antibiotic is zinc Bacitracin and is present in an amount of from 5 to 20 ppm.

9. The animal feed of claim 1 wherein said antibiotic is zinc Bacitracin and is present in an amount of from 7.5 to 15 ppm.

10. The animal feed of claim 1 wherein said antibiotic is zinc Bacitracin and is present in an amount of from 21 to 150 ppm.

11. The animal feed of claim 1 wherein said antibiotic is zinc Bacitracin and is present in an amount of from 80 to 150 ppm.

12. The animal feed of claim 1 wherein said antibiotic is flavophospholipol and is present in an amount of from 20 to 150 ppm.

13. The animal feed of claim 1 wherein said antibiotic is flavophospholipol and is present in an amount of from 60 to 100 ppm.

14. A method for efficient rearing of animals comprising feeding animals a high efficiency animal feed comprising carbohydrates, protein and fats and containing from 5 to 150 ppm of an antibiotic selected from the group consisting of Virginiamycin, zinc Bacitracin and flavophospholipol and a content of acid proteolytic enzymes with a wide spectrum of action in the range of between a pH of 2.5 and 6.5 in such an amount that the enzymatic activity is from 0.05 to 2.5 mTU/gm of said animal feed.

15. The method of claim 14 wherein said acid protease has a pH range of 50% of maximum activity of between a pH of 2.5 and a pH of 6.5.

16. The method of claim 14 wherein said enzymatic activity is from 0.2 to 0.5 mTU/gm of said animal feed.

17. The method of claim 14 wherein said antibiotic is Virginiamycin and is present in an amount of from 5 to 20 ppm.

18. The method of claim 17 wherein said animals are cockerels.

19. The method of claim 14 wherein said antibiotic is Virginiamycin and is present in an amount of from 7.5 to 15 ppm.

20. The method of claim 14 wherein said antibiotic is Virginiamycin and is present in an amount of from 21 to 150 ppm.

21. The method of claim 20 wherein said animals are piglets and laying hens.

22. The method of claim 14 wherein said antibiotic is Virginiamycin and is present in an amount of from 40 to 80 ppm.

23. The method of claim 14 wherein said antibiotic is zinc Bacitracin and is present in an amount of from 5 to 20 ppm.

24. The method of claim 23 wherein said animals are cockerels.

25. The method of claim 14 wherein said antibiotic is zinc Bacitracin and is present in an amount of from 7.5 to 15 ppm.

26. The method of claim 14 wherein said antibiotic is zinc Bacitracin and is present in an amount of from 21 to 150 ppm.

27. The method of claim 26 wherein said animals are piglets and laying hens.

28. The method of claim 14 wherein said antibiotic is zinc Bacitracin and is present in an amount of from 80 to 150 ppm.

29. The method of claim 14 wherein said antibiotic is flavophospholipol and is present in an amount of from 20 to 150 ppm.

30. The method of claim 29 wherein said animals are piglets and laying hens.

31. The method of claim 14 wherein said antibiotic is flavophospholipol and is present in an amount of from 60 to 100 ppm.

* * * * *